United States Patent [19]
Bruckert et al.

[11] Patent Number: 5,822,359
[45] Date of Patent: Oct. 13, 1998

[54] COHERENT RANDOM ACCESS CHANNEL IN A SPREAD-SPECTRUM COMMUNICATION SYSTEM AND METHOD

[75] Inventors: Eugene J. Bruckert, Arlington Heights, Ill.; Shawn B. Dempster, North Oaks, Minn.; Fuyun Ling, Hoffman Estates, Ill.

[73] Assignee: Motorola, Inc., Schaumburg, Ill.

[21] Appl. No.: 323,944

[22] Filed: Oct. 17, 1994

[51] Int. Cl.[6] .................................................. H04B 1/707
[52] U.S. Cl. ........................ 375/200; 375/206; 375/208; 375/367; 370/209; 370/320; 370/335; 370/342; 370/515
[58] Field of Search ...................... 375/200, 205, 375/208, 206, 367; 370/18, 22, 95.1, 100.1, 105.1, 105.4, 111, 209, 320, 335, 342, 515, 527; 380/46, 47, 48

[56] References Cited

U.S. PATENT DOCUMENTS

| | | | |
|---|---|---|---|
| 5,204,876 | 4/1993 | Bruckert et al. | 375/200 |
| 5,235,614 | 8/1993 | Bruckert et al. | 375/205 |
| 5,329,547 | 7/1994 | Ling | 375/205 |
| 5,353,300 | 10/1994 | Lee et al. | 375/205 |
| 5,359,624 | 10/1994 | Lee et al. | 375/205 |
| 5,412,686 | 5/1995 | Ling | 375/200 |

*Primary Examiner*—Don N. Vo
*Attorney, Agent, or Firm*—Richard A. Sonnentag

[57] ABSTRACT

A method and apparatus is provided to facilitate coherent communication in a random access channel. In encoding, reference symbols are inserted into a stream of access channel message data symbols and appended to a synchronization message to form a reference coded access channel transmission. Subsequently, the access channel transmission is prepared for transmission over a communication channel by being spread with a spreading code. In decoding, a known synchronization sequence is correlated with a received communication signal to generate a correlation peak when a synchronization message is present. The received communication signal is despread with a spreading code to derive a stream of reference samples and data samples. A channel response is determined from the correlation peak and revised based on estimates derived from the stream of reference samples. Finally, an estimated data symbol is detected from the stream of data samples by utilizing the revised channel response.

32 Claims, 3 Drawing Sheets

COHERENT RANDOM ACCESS CHANNEL IN A SPREAD-SPECTRUM COMMUNICATION SYSTEM AND METHOD

RELATED INVENTIONS

The present invention is related to the following inventions which are assigned to the assignee of the present invention:

Method And Apparatus For Coherent Communication In A Spread-Spectrum Communication System by Fuyun Ling having U.S. Ser. No. 08/031,258, and filed on Mar. 11, 1991, now U.S. Pat. No. 5,329,547 which was issued on Jul. 12, 1994.

Method And Apparatus For Providing High Data Rate Traffic Channels In A Spread Spectrum Communication System by Gene Bruckert et al. having U.S. Ser. No. 07/669,127, and filed on Mar. 13, 1991, now U.S. Pat. No. 5,204,876 which was issued on Apr. 20, 1993.

Method And Apparatus For Accommodating A Variable Number Of Communication Channels In A Spread Spectrum Communication System by Gene Bruckert et al. having U.S. Ser. No. 07/669,134, and filed on Mar. 13, 1991, now U.S. Pat. No. 5,235,614 which was issued on Aug. 10, 1993.

FIELD OF THE INVENTION

The present invention relates to communication systems which employ spread-spectrum signals and, more particularly, to a method and apparatus for a coherent random access channel in a spread-spectrum communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

One type of communication system is a multiple access spread-spectrum system. In a spread-spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread-spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread-spectrum communication techniques exist, including direct sequence modulation, frequency and/or time hopping modulation, and chirp modulation. In direct sequence modulation, a carrier signal is modulated by a digital code sequence whose bit rate is much higher than the information signal bandwidth.

Information (i.e. the message signal consisting of voice and/or data) can be embedded in the direct sequence spread-spectrum signal by several methods. One method is to add the information to the spreading code before it is used for spreading modulation. It will be noted that the information being sent must be in a digital form prior to adding it to the spreading code, because the combination of the spreading code and the information typically a binary code involves modulo-2 addition. Alternatively, the information or message signal may be used to modulate a carrier before spreading it.

These direct sequence spread-spectrum communication systems can readily be designed as multiple access communication systems. For example, a spread-spectrum system may be designed as a direct sequence code division multiple access (DS-CDMA) system. In a DS-CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero.

Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are not enhanced.

It will be appreciated by those skilled in the art that several different spreading codes exist which can be used to separate data signals from one another in a DS-CDMA communication system. These spreading codes include but are not limited to pseudonoise (PN) codes and Walsh codes. A Walsh code corresponds to a single row or column of the Hadamard matrix.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Typically, channel coding reduces the probability of bit error, and/or reduces the required signal to noise ratio usually expressed as error bits per noise density (i.e., $E_b/N_0$ which is defined as the ratio of energy per information-bit to noise-spectral density), to recover the signal at the cost of expending more bandwidth than would otherwise be necessary to transmit the data signal. For example, Walsh codes can be used to channel code a data signal prior to modulation of the data signal for subsequent transmission. Similarly PN spreading codes can be used to channel code a data signal.

However, channel coding alone may not provide the required signal to noise ratio for some communication system designs which require the system to be able to handle a particular number of simultaneous communications (all having a minimum signal to noise ratio). This design constraint may be satisfied, in some instances, by designing the communication system to coherently detect transmitted signals rather than using non-coherent reception techniques. It will be appreciated by those skilled in the art that a coherent receiver requires less signal to noise ratio (in $E_b/N_o$) than that required by a non-coherent receiver having the same bit error rate (i.e., a particular design constraint denoting an acceptable interference level). Roughly speaking, there is a three deciBel (dB) difference between them for the Rayleigh fading channel. The advantage of the coherent receiver is more significant when diversity reception is used, because there is no combining loss for an optimal coherent receiver while there is always a combining loss for noncoherent receiver.

One such method for facilitating coherent detection of transmitted signals is to use a pilot signal. For example, in a cellular communication system the forward channel, or down-link, (i.e., from base station to mobile unit) may be coherently detected, if the base station transmits a pilot signal. Subsequently, all the mobile units use the pilot channel signal to estimate the channel phase and magnitude parameters. However, for the reverse channel, or up-link, (i.e., from mobile to base station), using such a common pilot signal is not feasible. As a result, those of ordinary skill in the art often assume that only non-coherent detection techniques are suitable for up-link communication.

As a result, many recent publications have focused on optimizing non-coherent reception in DS-CDMA systems. For example, see the following articles.

A. Salmasi and K. S. Gilhousen, "On The System Design Aspects of Code Division Multiple Access (CDMA) Applied to Digital Cellular And Personal Communications Networks," *Proc. of VTC'91*, pp. 57–62, 1991.

F. Ling and D. Falconer, "Orthogonal/Convolutional Coding for Reverse Channel CDMA Communication," *Proc. of VTC'92*, pp. 63–66, May, 1992, Denver, Colo.

L. F. Chang and N. R. Sollenberger, "Comparison of Two Interleaving Techniques for CDMA Radio Communication Systems," *Proc. of VTC'92*, pp. 275–278, May, 1992, Denver, Colo.

Y. J. Liu, "Soft Decision Decoding for a Bit-interleaved Convolutionally Encoded Code Division Multiple Access System over Rayleigh Fading Channel," *Proc. of PIMRC'92*, pp. 128–132, October 1992.

Each of these articles show that a substantial difference in performance exists when different coding, modulation, detection and interleaving techniques are used for up-link communication in cellular communication systems.

In the A. Salmasi and K. S. Gilhousen article, a DS-CDMA communication system is described which uses bit-by-bit interleaving within convolutional and orthogonal coding scheme to optimize noncoherent reception in DS-CDMA communication systems.

In the F. Ling and D. Falconer article as well as the L. F. Chang and N. R. Sollenberger article, an up-link DS-CDMA system that employs Walsh coding (i.e., orthogonal coding), non-coherent detection and using orthogonal symbol (i.e., word-by-word) interleaving instead of bit-by-bit interleaving was disclosed. The L. F. Chang and N. R. Sollenberger article shows that a word-by-word interleaved convolutional and orthogonal coding scheme requires about 1 to 1.4 dB less $E_b/N_o$ than the similar bit-by-bit interleaving scheme described by in the A. Salmasi and K. S. Gilhousen article when the communication system which employs either scheme also utilizes power control of mobile communication units which move at different speeds (e.g., move at rates ranging from 0 to 100 kilometers per hour). While the word-by-word interleaving convolutional/orthogonal coding scheme has better performance than the bit-by-bit one, it has less implicit diversity than the latter. Moreover, it is still a non-coherent communication system and the combing loss can not be avoided.

Finally, the Y. J. Liu article describes a more sophisticated detection technique in which the performance of the up-link DS-CDMA communication system with Walsh coding and bit-level interleaving can be improved with a 4-port diversity combining without changing the interleaving method.

However, even in view of the above-described improvements for non-coherent communication systems, a need still exists for a communication system which employs coherent detection techniques. Such a coherent communication system was described in the above-mentioned related invention disclosed in the Ling '547 patent. However, the Ling '547 patent is focused on improvements to the traffic communication channel of a communication system.

A need still exists for a communication system which applies the coherent detection techniques described in the Ling '547 patent in the access channel transmissions in a random access channel (RACCH).

SUMMARY OF THE INVENTION

A method and apparatus is provided to facilitate coherent communication in a random access channel. In encoding, reference symbols are inserted into a stream of access channel message data symbols and appended to a synchronization message to form a reference coded access channel transmission. Subsequently, the access channel transmission is prepared for transmission over a communication channel by being spread with a spreading code. In decoding, a known synchronization sequence is correlated with a received communication signal to generate a correlation peak when a synchronization message is present. The received communication signal is despread with a spreading code to derive a stream of reference samples and data samples. A channel response is determined from the correlation peak and revised based on estimates derived from the stream of reference samples. Finally, an estimated data symbol is detected from the stream of data samples by utilizing the revised channel response.

These and various other features as well as advantages which characterize the present invention will be apparent upon reading of the following detailed description and review of the associated drawings.

DETAILED DESCRIPTION

Figure 1:
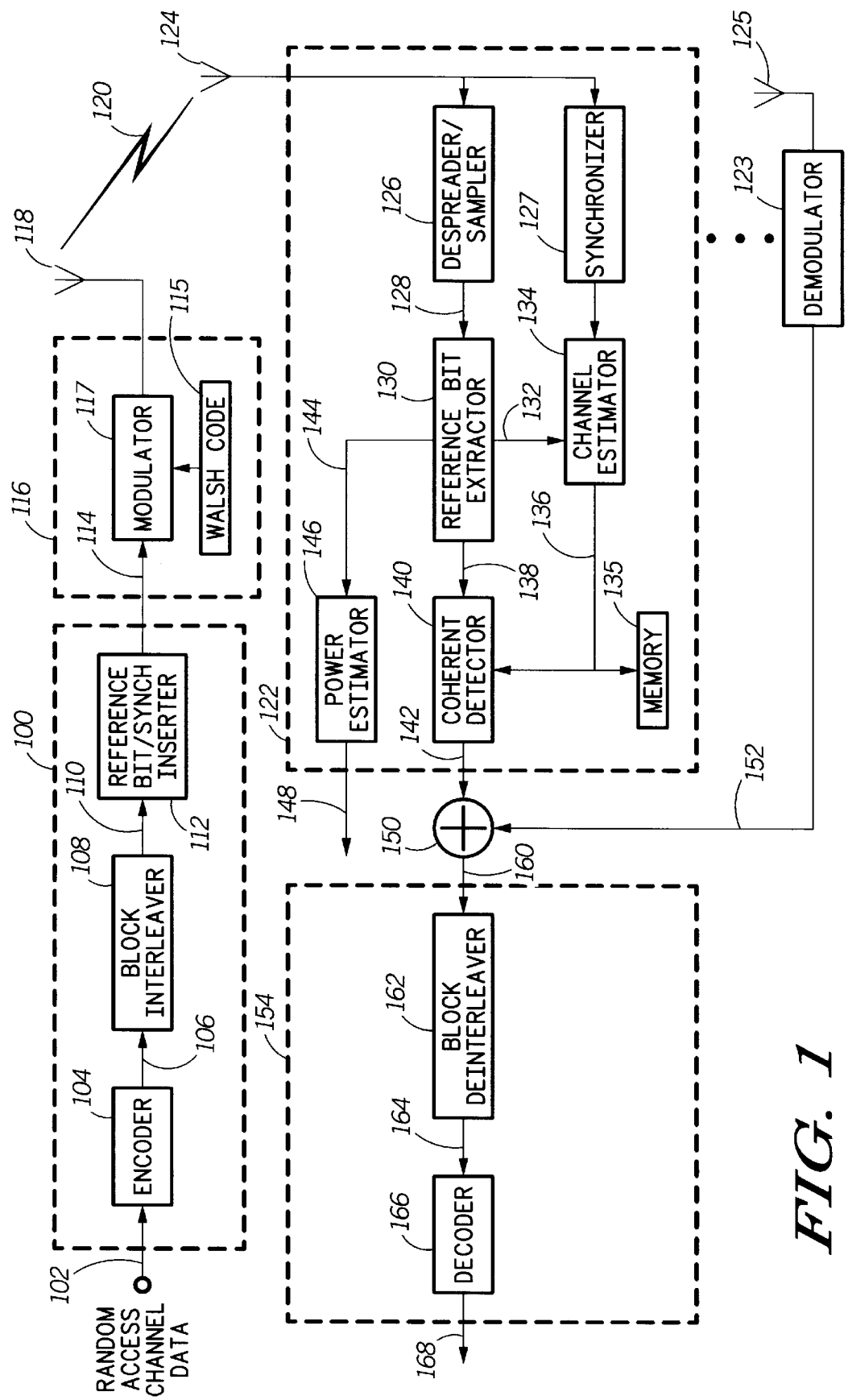
FIG. 1 is a block diagram showing a preferred embodiment communication system in accordance with the present invention.

The following description is directed for use in a direct sequence code division multiple access (DS-CDMA) communication system. One such DS-CDMA system is described in the communication standard known as IS-95 or "Mobile Station-Base Station Compatibility Standard for Dual-Mode Wideband Spread Spectrum Cellular System" as well as IS-96 or "Speech Service Option Standard For Wideband Spread Spectrum Digital Cellular System" and published by the Telecommunications Industries Association (TIA), 2001 Pennsylvania Ave, N.W., Washington, D.C. 20006. It will be appreciated by those skilled in the art that, although the description is focused on a DS-CDMA communication system similar to that which is described in IS-95 and IS-96, the principles described herein may be readily applied to other types of communication systems (e.g., personal communication systems, trunked systems, satellite communication systems, data networks, and the like).

The Ling '547 patent described a new approach for up-link DS-CDMA communication. This new approach employed coherent detection with reference-symbol based channel estimation. It was shown that a substantial gain in $E_b/N_0$ can be obtained relative to noncoherent detection techniques (e.g., described in IS-95 and IS-96) by applying such a coherent detection method to up-link DS-CDMA communication. In particular, simulation results have shown that the required $E_b/N_0$ by using this new scheme is about 2.5 dB lower than non-coherent detection of Walsh coding with bit-by-bit interleaving or 1.3 dB lower than non-coherent detection with Walsh symbol (i.e., word-by-word) interleaving over the entire range of practical mobile communication unit speeds (i.e., speeds of 0 to 100 kilometers per hour).

This means that if the principles described in the Ling '547 patent are applied to a RACCH signal a base station will need a lower $E_b/N_0$ to acquire the RACCH signal from a mobile communication unit. As a result, the mobile communication unit will not need to transmit the RACCH at as high a power level, on average, in a coherently detected communication system as would be required in a non-coherently detected communication system. This would effectively reduce the power budget needs of a mobile communication unit which in turn allows a user to have a longer talk time on the mobile communication unit.

In addition, a DS-CDMA communication system is noise or interference limited and a large part of the interference comes from high powered transmissions of other mobile communication units operating in the communication system. Therefore, by reducing the average power level used in transmitting on the RACCH will also increase the overall user capacity of a coherently detected communication system over what would be required in a non-coherently detected communication system.

By using encoding and decoding techniques in the RACCH and the up-link traffic channels which are substantially similar, a mobile communication unit and a base site may use substantially similar components which results in cost saving due to a higher volume production of the components. In addition, the mobile communication unit can share components or digital signal processing software code which perform the RACCH and traffic channel communications. This may lead to a reduced size mobile communication unit or at least a smaller integrated circuit. In contrast, IS-95 uses different signaling techniques for the RACCH and traffic channels such that few components may be shared and separate components must be produced for the RACCH and the traffic channel as well as for the mobile communication units and the base sites.

The general features, functions, and constraints of a conventional RACCH transmission are well known and described in IS-95. For example, a mobile communication unit may use the RACCH to send a registration message to a base station. A received registration message is used by the base station to register the mobile communication unit in the communication system so that the communication system knows where to find the mobile communication unit when a phone call, page, or other communication is directed to the mobile communication unit. Similarly, the RACCH can be used to send other messages from the mobile communication unit to the base station, including, but not limited to: an order message, data burst message, origination message, page response message, and an authentication challenge response message. The function and typical contents of these messages are described in IS-95.

Referring now to FIG. 1, a system for coherent communication in a RACCH of a spread-spectrum communication system is shown. In the encoding portion 100 of the communication system, random access channel data bits 102 are input to an encoder 104 at a particular bit rate (e.g., 4.8 kilobit/second). Encoder 104 encodes the input data bits 102 into data symbols at a fixed encoding rate (1/r) with an encoding algorithm which facilitates subsequent maximum likelihood decoding of the data symbols into data bits (e.g. convolutional or block coding algorithms). By way of example, in accordance with IS-95, a registration message has 288 data bits including a 160 data bit message body, a cyclical redundant code (CRC) and padding so encoder 104 encodes these random access channel data bits 102 (e.g., 288 input data bits that were received at a rate of 4.8 kilobits/ second) at a fixed encoding rate of one data bit to three data symbols (i.e., 1/3) and then repeated to obtain an effective encoding rate of one data bit to six data symbols such that the encoder 102 outputs data symbols 106 (e.g., 1728 data symbols output at a 28.8 kilosymbols/second rate).

The data symbols 106 are then input into an interleaver 108. Interleaver 108 organizes the data symbols 106 into blocks (i.e., frames) and block interleaves the input data symbols 106 at the symbol level. In the interleaver 108, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols 110 are output by the interleaver 108 at the same data symbol rate that they were input (e.g., 28.8 kilosymbols/second). The predetermined size of the block of data symbols defined by the matrix is derived from the maximum number of data symbols which can be transmitted at a coded bit rate within a predetermined length transmission block. For example, if data symbols 106 are output from the encoder 104 at a 28.8 kilosymbols/second rate, and if the predetermined length of the transmission block is 20 milliseconds, then the predetermined size of the block of data symbols is 28.8 kilosymbols/second times 20 milliseconds which equals 576 data symbols which defines a 18 by 32 matrix. As such the 1728 data symbols are divided into three interleaved frames of data symbols 110 by interleaver 108.

The interleaved data symbols 110 are then input to a reference bit/synch inserter 112 which inserts L known reference bits for every M interleaved data symbols 110. To simplify the following discussion, it will be assumed that L=1 and M=6. In addition, it will be assumed that each inserted reference bit is a zero bit. However, it will be appreciated by those skilled in the art that L and M could be any other value without departing from the scope and spirit of the present invention. In addition, the reference bits could be any known sequence such as all one bits or several one bits followed by several zero bits without departing from the scope and spirit of the present invention. When L=1 and M=6, reference bit/synch inserter 112 outputs 672 reference-coded bits 113 for each block (i.e., frame) such that a reference bit is inserted between each group of six access channel message data symbols to form a reference coded stream of access channel message data symbols.

Figure 2:
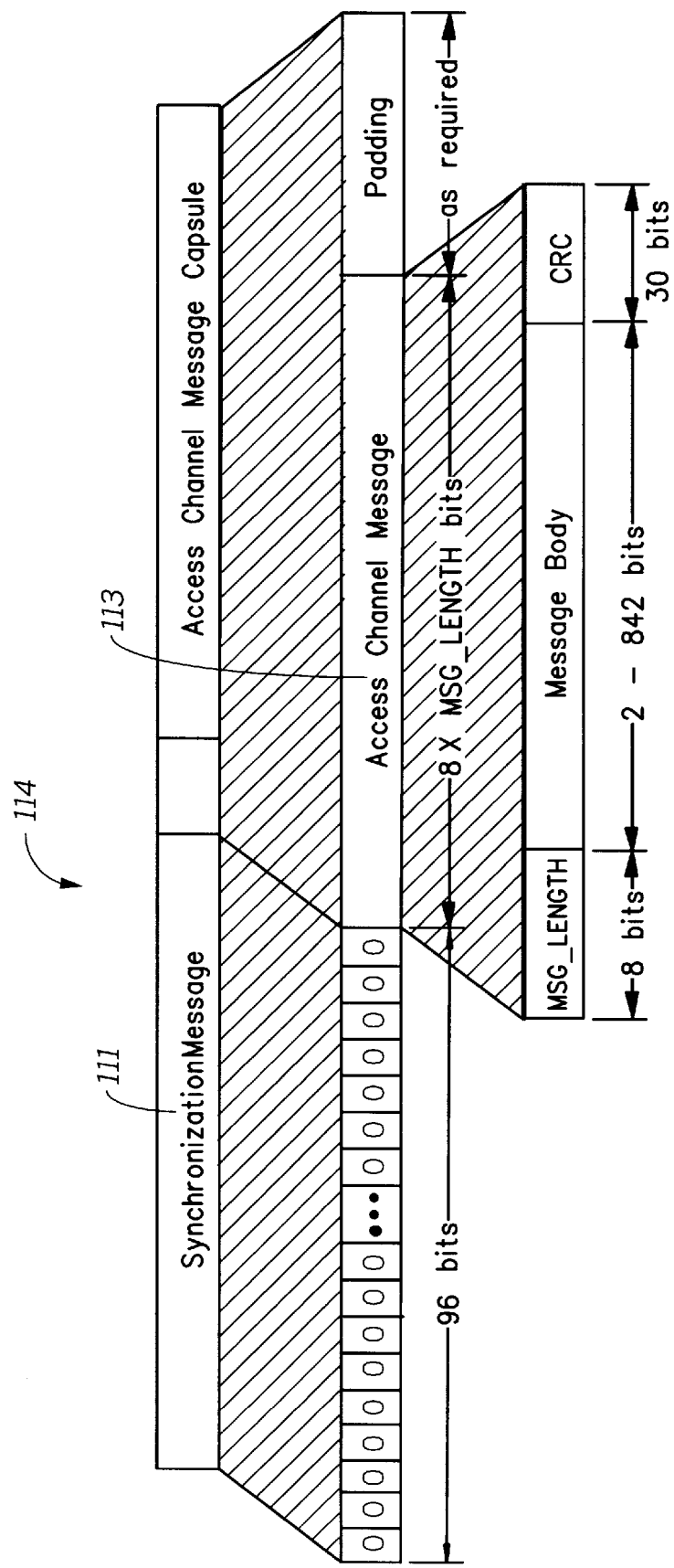
FIG. 2 is a block diagram showing a preferred embodiment access channel slot structure for use in the preferred embodiment communication system shown in FIG. 1.

In addition, reference bit/synch inserter 112 appends the reference-coded stream of access channel message data symbols 113 onto the end of a preferably one frame long synchronization message 111 to form a reference-coded access channel transmission 114. The synchronization message 111 preferably consists of 96 data bits set to zero which are encoded into 576 data symbols. An example of a transmitted block (i.e., 4 frame) of reference-coded access channel transmission 114 consisting of a synchronization message 111 and a reference-coded stream of access channel message data symbols 113 is shown in FIG. 2.

The reference-coded access channel transmission 114 is output from encoding portion 100 of the communication system and input to a transmitting portion 116 of the communication system. The reference-coded access channel transmission 114 is prepared for transmission over a communication channel by a modulator 117. Subsequently, the modulated signal is provided to an antenna 118 for transmission over the communication channel 120.

The modulator 117 preferably prepares the access channel transmission 114 for direct sequence code divided spread-spectrum transmission by deriving a sequence of fixed length codes from the access channel transmission 114 in a spreading process. For example, each of the access channel message data symbols 113 within the reference-coded access channel transmission 114 may be spread to a unique nine bit length code such that a group of six data symbols is represented by a single 54 bit length code. In addition, each reference bit within the reference-coded access channel message data symbols 113 may select a ten bit length code. The codes representing the group of six data symbols and an associated reference bit preferably are combined to form a single 64 bit length code. In addition, six data symbols of the synchronization message 111 may be spread to a 64 bit length code. As a result of this spreading process, the modulator 117 which received the access channel transmission 114 at a fixed rate (e.g., 28.8 kilosymbols/second) now has a spread sequence of 64 bit length codes having a higher fixed symbol rate (e.g., 307.2 kilosymbols/second). It will be appreciated by those skilled in the art that the reference bits and data symbols within the access channel transmission 114 may be spread according to numerous other algorithms into a sequence of larger length codes without departing from the scope and spirit of the present invention.

The spread sequence is further prepared by the modulator 117 for direct sequence code divided spread-spectrum transmission by further spreading the spread sequence with a long spreading code (e.g. PN code). The spreading code is a user specific sequence of symbols or unique user code which is output at a fixed chip rate (e.g., 1.2288 Megachips/second). In addition to providing an identification as to which user sent the encoded traffic channel data bits 102 over the communication channel 120, the unique user code enhances the security of the communication in the communication channel by scrambling the encoded random access channel data bits 102. In addition, the user code spread encoded data bits (i.e. data symbols) are used to bi-phase modulate a sinusoid by driving the phase controls of the sinusoid. The sinusoid output signal is bandpass filtered, translated to an RF frequency, amplified, filtered and radiated by an antenna 118 to complete transmission of the traffic channel data bits 102 in a communication channel 120 with binary phase shift keying (BPSK) modulation.

A receiving portion 122 of the communication system receives the transmitted spread-spectrum signal from over the communication channel 120 through antenna 124. A synchronizer 127 correlates a known synchronization sequence with the received communication signal to generate a correlation peak when a synchronization message is present in the received communication signal. The received signal is sampled into data samples by despreader and sampler 126 when the correlation peak is generated. Subsequently, the data samples 142 are output to the decoding portion 154 of the communication system.

The despreader and sampler 126 preferably BPSK samples the received spread-spectrum signal by filtering, demodulating, translating from the RF frequencies, and sampling at a predetermined rate (e.g., 1.2288 Megasamples/second). Subsequently, the BPSK sampled signal is despread by correlating the received sampled signals with the long spreading code. The resulting despread sampled signal 128 is sampled at a predetermined rate and output to a reference bit extractor 130 (e.g., 307.2 kilosamples/second so that a sequence of four samples of the received spread-spectrum signal is despread and/or represented by a single data sample).

The reference bit extractor 130 preferably extracts the reference bits 132 from the despread sampled signal 128 and outputs the reference bits 132 to a channel estimator 134. The remaining data samples 138 from the despread sampled signal 128 are output to a coherent detector 140 for later coherent detection of data samples 142.

The channel estimator 134 determining an initial channel response from the correlation peak generated by the synchronizer 127. In addition, the channel estimator 134 correlates the extracted reference bits 132 with a known reference sequence of data samples to obtain unbiased, but noisy, estimated channel response. The channel estimator 134 modifies the initial channel response based on the estimated channel response to form a modified channel response estimate 136. In order to obtain a better modified channel response estimate 136, these noisy estimates may be passed through a low-pass filter, which may be fixed or adaptive, to remove the high frequency noise components. The resulting modified channel response estimates 136 are relatively noise-free and can be used for coherent detection. It should be noted that the low pass filtering only gives us a channel estimate for every (M+1)T, where M is the number of data symbols between each reference bit inserted by reference bit inserter 112 (e.g., M=6) and where T is the time interval of each data sample. To perform coherent detection of transmitted data symbols, we need to have a channel estimate for every T. When (M+1)T is short relative to the channel variation time constant, a simple but effective method to get a modified channel response estimate for every T is to perform linear interpolation between two modified channel response estimates separated by (M+1)T. however, as will be appreciated by those skilled in the art more sophisticated interpolation techniques may be used if necessary.

Because the RACCH and traffic channel communication procedures are substantially similar and the components may be shared in the preferred embodiment of the present invention, the modified channel response estimate 136 may be stored in a memory 135 for subsequent use in detecting operations performed on the traffic communication channel.

In the preferred embodiment coherent communication system, power control may also be used to enhance overall system performance. The power control algorithms may be very similar to the algorithms used in non-coherent communication systems. The preferred embodiment power control algorithm preferably includes estimating received RAACH power every 1.25 milliseconds (i.e., each block or frame), or every 12 information bits, i.e., every 36 encoded bits or 42 total received signal samples. These RAACH channel estimates could be used to set initial power control parameters for other types of channels such as the traffic channel. The power estimate may be calculated with several different techniques. One technique is to compute a channel estimate with a power estimator 146 by using simply the six reference signal samples (i.e., reference bits 144 from reference bit extractor 130) in a 42 bit length block. The square of the magnitude of the channel estimate is then output by the power estimator 146 as the power estimate 148.

After modified channel response estimates 136 are generated, the rest of the receiver is conventional. The coherent detector 140 multiplies the remaining data samples 138 from the despread sampled signal 128 by the conjugate of the channel estimates 136 to generate coherently detected samples 142.

As will be appreciated by those skilled in the art, multiple receiving portions 122 through 123 and antennae 124 through 125, respectively, to achieve space diversity. The Nth receiver portion would operate in substantially the same manner to retrieve data samples from the received spread-spectrum signal in communication channel 120 as the above described receiving portion 122. The outputs 142 through 152 of the N receiving portions preferably are input to a summer 150 which diversity combines the input data samples into a composite stream of coherently detected data samples 160.

The individual data samples 160 which form soft decision data are then input into a decoding portion 154 including a deinterleaver 162 which deinterleaves the input soft decision data 160 at the individual data level. In the deinterleaver 162, the soft decision data 160 are individually input into a matrix which defines a predetermined size block of soft decision data. The soft decision data are input into locations within the matrix so that the matrix is filled in a row by row manner. The deinterleaved soft decision data 164 are individually output from locations within the matrix so that the matrix is emptied in a column by column manner. The deinterleaved soft decision data 164 are output by the deinterleaver 162 at the same rate that they were input (e.g., 28.8 kilometrics/second).

The predetermined size of the block of soft decision data defined by the matrix is derived from the maximum rate of sampling data samples from the spread-spectrum signal received within the predetermined length transmission block.

The deinterleaved soft decision data 164, are input to a decoder 166 which uses maximum likelihood decoding techniques to generate estimated random access channel data bits 168. The maximum likelihood decoding techniques may be augmented by using an algorithm which is substantially similar to a Viterbi decoding algorithm. The decoder 166 uses a group of the individual soft decision data 164 to form a set of soft decision transition metrics. These transition metrics are used at each particular time state of the maximum likelihood sequence estimation decoder 166. The number of soft decision data 164 in the group used to form each set of soft decision transition metrics corresponds to the number of data symbols 106 at the output of the convolutional encoder 104 generated from each input data bit 102. The number of soft decision transition metrics in each set is equal to two raised to the power of the number of coded data symbol generated by the convolutional encoder 104 before repetition. For example, when an 1/3 convolutional encoder is used in the transmitter, three data symbols are generated from each input data bit 102. These three data symbols become 6 data symbols 106 after repetition. The decoder 166 combines (sums) the corresponding repeated soft decision data 164 to form combined soft decision data. Thus, a group of six individual soft decision data 164 yield a group of three combined soft decision data, which, in turn, form 8 soft decision transition metrics for use at each time state in the maximum likelihood sequence estimation decoder 166. The estimated data bits 168 are generated at a rate related to the rate that the soft decision data 164 are input to the decoder 166 and the fixed rate used to originally encode the input data bits 102 (e.g., if the soft decision data are input at 28.8 kilometrics/second and the original encoding rate was effectively 1/6 then estimated data bits 168 are output at a rate of 4800 bits/second).

In an alternative embodiment of the present invention, the principals in the above-mentioned related invention disclosed in the Bruckert et al. '876 and '614 patents may be applied to the present invention. The modulator 117 may use a Walsh code generator 115 to generate a Walsh code which can be used in place of the long spreading code to differentiate unique users (i.e., mobile communication units) from one another. For example, $Walsh_0$ code out of 64 codes in a Hadamard matrix may be used to identify a particular user in an access channel slot. This an access channel slot (e.g., $Walsh_0$ code) may be further partitioned into at least two subchannels in which different reference coded access channel transmissions can be communicated. In the preferred alternative embodiment, the modulator 117 forms two distinct 128 bit length Walsh codes (e.g., see Table 1 in the Bruckert '876 patent) as the spreading code to partition the access channel slot (e.g., see Table 1 in the Bruckert '876 patent) into two subchannels, rather than the previously described 64 bit length Walsh codes. It will be appreciated by those skilled in the art that the access channel slot may be partitioned into any number of subchannels which are a multiple of two (e.g., for 4 subchannels a 256 bit length Walsh codes must be used). The modulator 117 selection process is the same for the 128 and 64 bit length Walsh codes, except that the 128 bit length Walsh codes must be orthogonal to the remaining 63 other 64 bit length Walsh codes of a Hadamard matrix. In addition, the padding must be a repetition of the same Walsh code used to spread the RAACH data symbols. Each of the 128 bit length Walsh code divided subchannels is capable of sending random access channel data bits 102 at a 2.4 kilobit/second rate over the communication channel 120 (versus a 4.8. kilobit/second rate that a 64 bit length Walsh code is capable of sending). The despreader and sampler 126 (i.e., demodulator) must also be modified to use a 128 and 64 bit length Walsh code as the spreading code in a reciprocal manner to the modulator 117 to differentiate between the two different subchannels of an access channel slot. It should be noted that the reference bit/synch inserter 112 will need to be modified in the alternative embodiment to insert one reference bit for every three data symbols. This chip rate after spreading preferably is the same as the preferred embodiment (i.e., 1.2288 Megachips/second). It will be appreciated by those skilled in the art that each subchannel may have reference coded access channel transmissions originating from different transmission sources such that the effective number of available RACCH can be doubled.

Thus, a communication system for coherently encoding and decoding has been described above with reference to FIG. 1. The preferred embodiment operations of the communication system may be summarized with reference to FIGS. 3 and 4 which show flowcharts of the transmitting and receiving processes, respectively.

Figure 3:
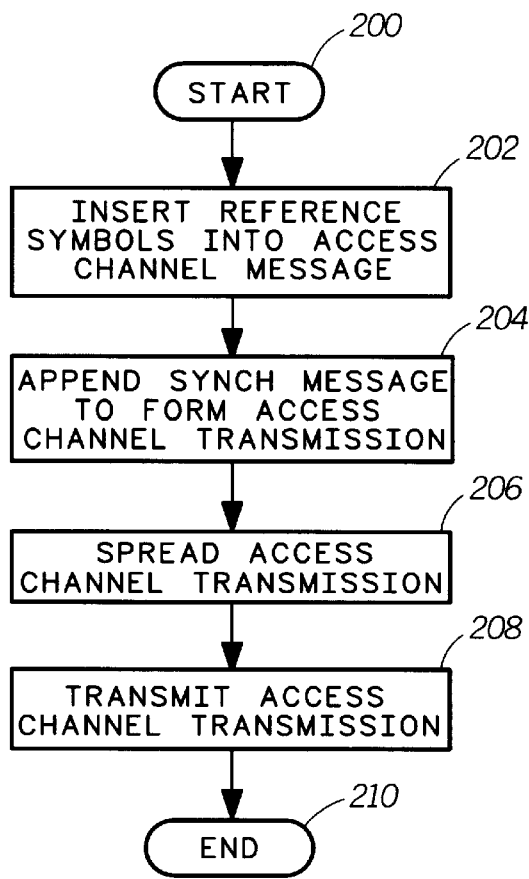
FIG. 3 is a flowchart showing a preferred embodiment transmitting process in accordance with the present invention.

In the transmitting process 200–210 shown in FIG. 3, reference symbols are inserted 202 into a stream of access channel message data symbols to form a reference coded stream of access channel message data symbols. The reference coded stream of access channel message data symbols are appended 204 onto the end of a synchronization message to form a reference coded access channel transmission. Subsequently, the reference coded access channel are prepared 206 transmission for transmission over a communication channel by spreading the reference coded access channel transmission with a spreading code to form a spread reference coded access channel transmission prior to transmission over the communication channel. These spreading operations of the preparing step 206 preferably are substantially similar to spreading operations of another preparing step utilized in communicating over a traffic communication channel of the communication system. Also, the preparing step 206 preferably uses a higher degree Walsh code (e.g., a 128 bit length Walsh code) as the spreading code to partition an access channel slot into at least two subchannels in which different reference coded access channel transmissions can be communicated. These Walsh codes (e.g., 128 bit length Walsh codes) preferably are selected such that they are orthogonal to the remaining 63 other 64 bit length Walsh codes of a Hadamard matrix. Finally, the spread reference coded access channel transmission is transmitted 208 over the communication channel.

Figure 4:
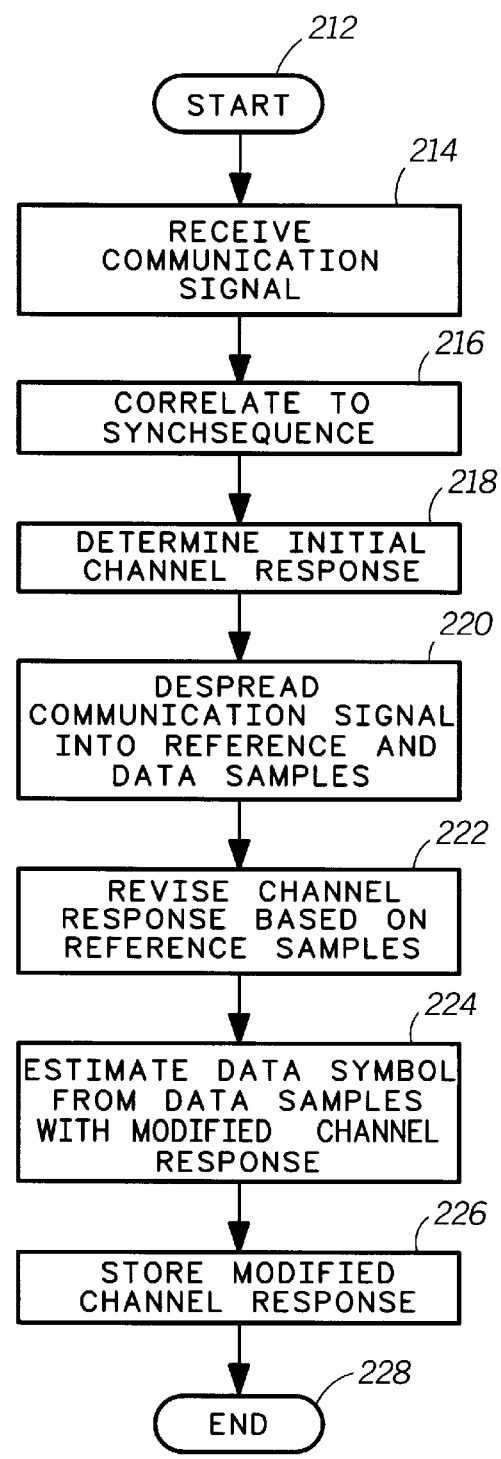
FIG. 4 is a flowchart showing a preferred embodiment receiving process in accordance with the present invention.

In the transmitting process 212–228 shown in FIG. 4, a communication signal is received 214 over a communication channel. A known synchronization sequence is correlated 216 with the received communication signal to detect a correlation peak and when this occurs a synchronization message is present in the received communication signal. In addition, an initial channel response is determined 218 from the correlation peak. Further, the received communication signal is despread 220 with a spreading code to derive a stream of reference samples and a stream of data samples when the correlation peak is generated. The initial channel response is revised 222 based on an estimated channel response derived from the stream of reference samples to form a modified channel response estimate. Subsequently, an estimated data symbol is generated 224 from the stream of data samples by utilizing the modified channel response estimate. These detecting operations of the despreading 220, revising 222, and generating 224 steps preferably are substantially similar to detecting operations utilized in communicating over a traffic communication channel of the communication system. Provided that these detection operation are similar, the modified channel response estimate preferably is stored 226 for subsequent use in detecting operations performed on the traffic communication channel. As needed, the despreading step 220 preferably uses a higher degree Walsh code (e.g., a 128 bit length Walsh code) as the spreading code to differentiate between at least two subchannels of an access channel slot. Each subchannel may have reference coded access channel transmissions originating from different transmission sources. These Walsh codes (e.g., 128 bit length Walsh codes) preferably are selected such that they are orthogonal to the remaining 63 other 64 bit length Walsh codes of a Hadamard matrix.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system as described were directed to CDMA spread-spectrum signals transmitted over a radio communication channel. However, as will be understood by those skilled in the art, the encoding and decoding techniques described and claimed herein can also be adapted for use in other types of transmission systems like those based on time division multiple access (TDMA) and frequency division multiple access (FDMA). In addition, the communication channel could alternatively be an electronic data bus, wireline, optical fiber link, satellite link, or any other type of communication channel. Furthermore, other channels of a communication system may be modified like the RACCH to be similar to the traffic channel so that the advantages of using similar components and coherent detection techniques can be extended to those other channels.

What is claimed is:

1. A communication unit for use in a communication system comprising:
   (a) reference means for inserting reference symbols into a stream of access channel message data symbols to form a reference coded stream of access channel message data symbols;
   (b) synch insertion means, operatively coupled to the reference means, for appending the reference coded stream of access channel message data symbols onto the end of a synchronization message to form a reference coded access channel transmission; and
   (c) spreading means, operatively coupled to the synch insertion means, for preparing the reference coded access channel transmission for transmission over a communication channel by spreading the reference coded access channel transmission with a spreading code to form a spread reference coded access channel transmission prior to transmission over the communication channel.

2. The communication unit of claim 1 wherein the spreading means is substantially similar to a spreading mechanism utilized in communicating over a traffic communication channel of the communication system.

3. The communication unit of claim 1 wherein the spreading means comprises means for using a Walsh code as the spreading code to partition an access channel slot into at least two subchannels in which different reference coded access channel transmissions can be communicated.

4. The communication unit of claim 3 wherein the spreading means comprises means for using two distinct 128 bit length Walsh codes as the spreading code to partition the access channel slot into two subchannels, the two 128 bit length Walsh codes being orthogonal to the remaining 63 other 64 bit length Walsh codes of a Hadamard matrix.

5. The communication unit of claim 1 further comprising a transmitting means, operatively coupled to the spreading means, for transmitting the spread reference coded access channel transmission over the communication channel.

6. The communication unit of claim 5 wherein the communication channel is selected from the group consisting of an electronic data bus, radio communication link, wireline, optical fiber link, and satellite link.

7. A communication unit for use in a communication system comprising:
(a) correlator means for correlating a known synchronization sequence with a received communication signal to generate a correlation peak when a synchronization message is present in the received communication signal;
(b) demodulator means, operatively coupled to the correlator means, for despreading the received communication signal with a spreading code to derive a stream of reference samples and a stream of data samples when the correlation peak is generated;
(c) channel estimator means, operatively coupled to the correlator means and the demodulator means, for determining an initial channel response from the correlation peak and revising the initial channel response based on an estimated channel response derived from the stream of reference samples to form a modified channel response estimate; and
(d) detector means, operatively coupled to the demodulator means and the channel estimator means, for generating an estimated data symbol from the stream of data samples by utilizing the modified channel response estimate.

8. The communication unit of claim 7 wherein the demodulator means, channel estimator means, and detector means are substantially similar to a demodulator, a channel estimator, and a detector, respectively, which are utilized in communicating over a traffic communication channel of the communication system.

9. The communication unit of claim 8 further comprising a storage means, operatively coupled to the channel estimator means, for storing the modified channel response estimate for subsequent use in detecting operations performed on the traffic communication channel.

10. The communication unit of claim 7 wherein the demodulator means comprises means for using a Walsh code as the spreading code to differentiate between at least two different subchannels of an access channel slot, each subchannel having reference coded access channel transmissions originating from different transmission sources.

11. The communication unit of claim 10 wherein the demodulator means comprises means for using two distinct 128 bit length Walsh codes as the spreading code to differentiate between two subchannels of the access channel slot, the two 128 bit length Walsh codes being orthogonal to the remaining 63 other 64 bit length Walsh codes of a Hadamard matrix.

12. The communication unit of claim 7 wherein the detector means comprises means for generating an estimated data bit by utilizing maximum likelihood decoding techniques to derive the estimated data bit from the estimated data symbol.

13. The communication unit of claim 7 wherein the detector means comprises means for generating an estimated data bit by utilizing a Viterbi maximum likelihood decoding algorithm to derive the estimated data bit from the estimated data symbol.

14. The communication unit of claim 7 further comprising a receiving means, operatively coupled to the correlator means and the demodulator means, for receiving the communication signal over a communication channel.

15. The communication unit of claim 14 wherein the communication channel is selected from the group consisting of an electronic data bus, radio communication link, wireline, optical fiber link, and a satellite link.

16. A communication system comprising:
(a) a transmitter, comprising:
(i) a reference insertion mechanism which inserts reference symbols into a stream of access channel message data symbols to form a reference coded stream of access channel message data symbols;
(ii) a synch insertion mechanism, operatively coupled to the reference insertion mechanism, which appends the reference coded stream of access channel message data symbols onto the end of a synchronization message to form a reference coded access channel transmission;
(iii) a modulator, operatively coupled to the synch insertion mechanism, which prepares the synch coded access channel transmission for transmission over a communication channel by spreading the reference coded access channel transmission with a spreading code to form a spread reference coded access channel transmission prior to transmission over the communication channel; and
(iv) a transmitting mechanism, operatively coupled to the modulator, for transmitting the spread reference coded access channel transmission over the communication channel; and
(b) a receiver, comprising:
(i) a receiving mechanism for receiving the spread reference coded access channel transmission over the communication channel;
(ii) correlator, operatively coupled to the receiving mechanism, for correlating a known synchronization sequence with the received spread reference coded access channel transmission to generate a correlation peak when a synchronization message is present in the received spread reference coded access channel transmission;
(iii) demodulator, operatively coupled to the receiving mechanism, for despreading the received spread reference coded access channel transmission with a spreading code to derive a stream of reference samples and a stream of data samples when the correlation peak is generated;
(iv) channel estimator, operatively coupled to the correlator and the demodulator, for determining an initial channel response from the correlation peak and revising the initial channel response based on an estimated channel response derived from the stream of reference samples to form a modified channel response estimate; and
(v) detector, operatively coupled to the demodulator and the channel estimator, for generating an estimated data symbol from the stream of data samples by utilizing the modified channel response estimate.

17. The communication system of claim 16 wherein the transmitter reference insertion mechanism, modulator and transmitting mechanism as well as receiver receiving mechanism, demodulator, channel estimator, and detector are substantially similar to other communication system components which are utilized in communicating over a traffic communication channel of the communication system.

18. The communication system of claim 17 further comprising a receiver storage memory, operatively coupled to the receiver channel estimator, for storing the modified channel response estimate for subsequent use in detecting operations performed on the traffic communication channel.

19. The communication system of claim 16 wherein:
(a) the transmitter modulator comprises means for using a distinct 128 bit length Walsh code as the spreading code to partition an access channel slot into a particular subchannel in which low rate reference coded access channel transmission can be communicated, the distinct 128 bit length Walsh code being orthogonal to the remaining 63 other 64 bit length Walsh codes of a Hadamard matrix; and
(b) receiver demodulator comprises means for using the same distinct 128 bit length Walsh code as the spreading code to despread the particular subchannel of the access channel slot.

20. The communication system of claim 16 wherein the receiver detector comprises means for generating an estimated data bit by utilizing maximum likelihood decoding techniques to derive the estimated data bit from the estimated data symbol.

21. The communication system of claim 16 wherein the communication channel is selected from the group consisting of an electronic data bus, radio communication link, wireline, optical fiber link, and satellite link.

22. A method of communication in a communication system comprising the steps of:
(a) inserting reference symbols into a stream of access channel message data symbols to form a reference coded stream of access channel message data symbols;
(b) appending the reference coded stream of access channel message data symbols onto the end of a synchronization message to form a reference coded access channel transmission; and
(c) preparing the reference coded access channel transmission for transmission over a communication channel by spreading the reference coded access channel transmission with a spreading code to form a spread reference coded access channel transmission prior to transmission over the communication channel.

23. The method of claim 22 wherein the spreading operations of the preparing step are substantially similar to spreading operations of another preparing step utilized in communicating over a traffic communication channel of the communication system.

24. The method of claim 22 wherein the preparing step comprises using a Walsh code as the spreading code to partition an access channel slot into at least two subchannels in which different reference coded access channel transmissions can be communicated.

25. The method of claim 24 wherein the preparing step comprises using two distinct 128 bit length Walsh codes as the spreading codes to partition the access channel slot into two subchannels, the two 128 bit length Walsh codes being orthogonal to the remaining 63 other 64 bit length Walsh codes of a Hadamard matrix.

26. The method of claim 22 further comprising the step of transmitting the spread reference coded access channel transmission over the communication channel.

27. A method of communication in a communication system comprising the steps of:
(a) correlating a known synchronization sequence with a received communication signal to generate a correlation peak when a synchronization message is present in the received communication signal;
(b) determining an initial channel response from the correlation peak;
(c) despreading the received communication signal with a spreading code to derive a stream of reference samples and a stream of data samples when the correlation peak is generated;
(d) revising the initial channel response based on an estimated channel response derived from the stream of reference samples to form a modified channel response estimate; and
(e) generating an estimated data symbol from the stream of data samples by utilizing the modified channel response estimate.

28. The method of claim 27 wherein the detecting operations of the despreading, revising, and generating steps are substantially similar to detecting operations utilized in communicating over a traffic communication channel of the communication system.

29. The method of claim 28 further comprising the step of storing the modified channel response estimate for subsequent use in detecting operations performed on the traffic communication channel.

30. The method of claim 27 wherein the despreading step comprises using a Walsh code as the spreading code to differentiate between at least two different subchannels of an access channel slot, each subchannel having reference coded access channel transmissions originating from different transmission sources.

31. The method of claim 30 wherein the despreading step comprises using two distinct 128 bit length Walsh codes as the spreading codes to differentiate between two subchannels of the access channel slot, the two 128 bit length Walsh codes being orthogonal to the remaining 63 other 64 bit length Walsh codes of a Hadamard matrix.

32. The method of claim 27 further comprising the step of receiving the communication signal over a communication channel.

* * * * *